US006711319B2

(12) United States Patent
Hoen

(10) Patent No.: US 6,711,319 B2
(45) Date of Patent: Mar. 23, 2004

(54) OPTICAL SWITCH WITH CONVERGING OPTICAL ELEMENT

(75) Inventor: Storrs T. Hoen, Brisbane, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 69 days.

(21) Appl. No.: 09/949,487

(22) Filed: Sep. 7, 2001

(65) Prior Publication Data

US 2003/0048980 A1 Mar. 13, 2003

(51) Int. Cl.[7] .............................. G02B 6/26; G02B 6/42
(52) U.S. Cl. ...................................................... 385/18
(58) Field of Search .............................. 385/15, 16, 17, 385/18, 33, 31

(56) References Cited

U.S. PATENT DOCUMENTS 5,712,705 A * 1/1998 Fattinger et al. ............ 356/521

* cited by examiner

Primary Examiner—Javaid H. Nasri
(74) Attorney, Agent, or Firm—Ian Hardcastle

(57) ABSTRACT

The optical switch comprises an input collimator, an output collimator, an input mirror, an output mirror and a converging optical element. The input collimator receives, collimates and outputs an input light beam. The input mirror is arranged to receive the light beam from the input collimator. The output mirror is arranged to receive the light beam reflected by the input mirror and reflects the light beam into the output collimator. The converging optical element is located to receive the light beam reflected by the input mirror and reflects the light beam onto the output mirror. An imaging element may be located between either or both of the input collimator and the output collimator and a respective one of the input mirror and the output mirror.

20 Claims, 10 Drawing Sheets

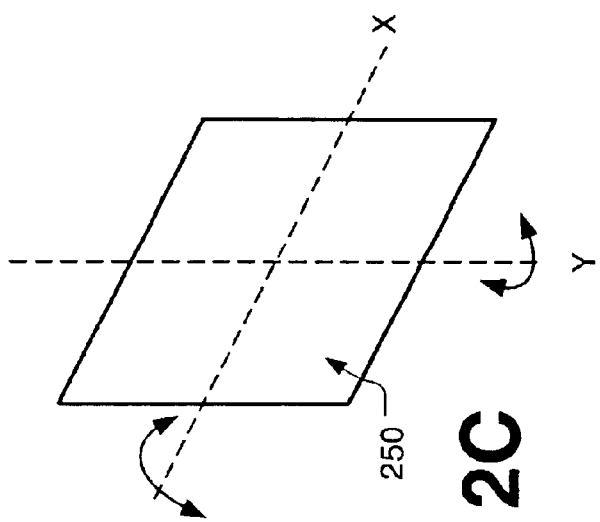

OPTICAL SWITCH WITH CONVERGING OPTICAL ELEMENT

FIELD OF THE INVENTION

The invention is directed to an optical switch and more particularly to an optical switch having a converging optical element.

BACKGROUND OF THE INVENTION

Optical switches for switching light signals between different optical fibers are known. A known optical switch 100 is shown in FIGS. 1A, 1B, 1C and 1D. The optical switch 100 is composed of input collimator array 110 for receiving multiple light beams, each representing an optical signal, via associated optical fibers 50. For clarity, only one optical fiber is shown in FIGS. 1A, 1B and 1D. A light beam is output from input collimator array 110 and directed onto a first micromirror that forms part of input micromirror array 120. The first micromirror can be rotated about at least one axis to direct the light to a second micromirror the forms part of output micromirror array 121. The second micromirror can be rotated about at least one axis to direct the light beam received from the first micromirror into the collimator corresponding to the second micromirror. The collimator is part of the output collimator array 111. Micromirror arrays 120 and 121 each incorporate micromirrors 25 (FIG. 1C).

In the optical switch 100, the input collimator array 110 must be very accurately aligned with respect to the input micromirror array 120 to make the light beam output by each collimator impinge on the center of the micromirror associated with that collimator. To achieve this alignment throughout the input collimator array, the collimators must be aligned so that they output light beams that are accurately parallel to one another. Such accuracy is difficult and expensive to achieve in production. Additionally, the input collimator array must incorporate custom collimators that each generate an output light beam that converges at the input micromirror array. This is less convenient and more expensive than using a standard collimator that generates parallel output light beam.

Similar considerations apply to the output collimator array 111, which must be accurately aligned with the output micromirror array 121 to ensure that the optical signal reflected by a particular output micromirror is properly coupled into its associated collimator of the output collimator array. Moreover, the optical beam propagates directly from the input micromirror array to the output micromirror array. As noted above, the collimators of the input collimator array should be configured to ensure that the light beam has the correct waist and curvature at the input micromirror array. Otherwise, the free space propagation of the light beam from the input micromirror array to the output micromirror array results in the light beam expanding to be much larger than the micromirrors of the output micromirror array.

A second example of a known optical switch is shown in FIG. 1D. In this, a fixed mirror 125 is interposed between an input micromirror array 120 and an output micromirror array 121 to redirect the light beam from input micromirror array 120 onto output micromirror array 121. Folding the optical path between the input micromirror array and the output micromirror array in this manner reduces the dimensions of the optical switch. However, as the fixed mirror 125 is flat, expansion or contraction of the beam diameter between the input and output micromirror arrays 120 and 121, respectively, occurs as if the mirror were not present. As before, the collimators of the input collimator should be custom devices configured to ensure the proper waist $w_0$ and curvature of the optical beam at the input micromirror array 120.

In the optical switches just described, the beam size at the output micromirror array limits how small the micromirrors may be. Large micromirrors increase the physical size of the optical switch and require more energy to switch them quickly. Moreover, a beam size larger than the micromirrors attenuates the optical signal, and can additionally result in crosstalk between the different optical signals that pass through the optical switch. Also, as described above, the alignment between the micromirror arrays and their respective collimators is critical. Finally, in the optical switches just described, approximately half of the angular range of those of the micromirrors located at and near the edges of the array is wasted. This means that, if all the micromirrors are identical as is usually desirable, fabrication of the micromirrors is more difficult than it need be because of the need to provide them with an increased angular range.

Thus, what is needed is an optical switch in which the beam size of the light beams that pass through the optical switch is small at the micromirror arrays, in which the alignment between the micromirror arrays and their respective collimators is less critical, in which the collimators do not have to output light beams that are accurately parallel, in which standard collimators that generate parallel beams of light can be used and in which micromirrors having an angular range corresponding to that of the micromirrors near the center of the array can be used throughout.

SUMMARY OF THE INVENTION

The invention provides an optical switch that comprises an input collimator, an output collimator, an input mirror, an output mirror and a converging optical element. The input collimator receives, collimates and outputs an input light beam. The input mirror is arranged to receive the light beam from the input collimator. The output mirror is arranged to receive the light beam reflected by the input mirror and reflects the light beam into the output collimator. The converging optical element is located to receive the light beam reflected by the input mirror and reflects the light beam onto the output mirror.

The converging optical element is located relative to the input mirror and the output mirror such that the waist of the light beam at the output mirror is similar in size to that at the input mirror.

An imaging element may be located between either or both of the input collimator and the output collimator and a respective one of the input mirror and the output mirror. The imaging element makes alignment between the collimators and their respective mirrors less critical, allows collimator forming part of an array to output respective light beams at different angles and allows the full range of angular movement of the mirror to be used.

The invention also provides an optical switch that comprises an input collimator, an output collimator, an input mirror, an output mirror and an imaging element. The input collimator receives, collimates and outputs an input light beam. The input mirror is arranged to receive the light beam from the input collimator. The output mirror is arranged to receive the light beam reflected by the input mirror and reflects the light beam into the output collimator. The imaging element images at least one of the input collimator and the output collimator on a respective one of the input mirror and the output mirror. The advantages conferred by the imaging element are described above.

The invention additionally provides a first method for switching an optical signal. In this, an optical switch including an input mirror and an output mirror is provided. The light beam is received, and is directed towards the input mirror. The orientation of the input mirror is adjusted to direct the light beam onto the output mirror. The light beam is converged after reflection by the input mirror and prior to reflection by the output mirror. The orientation of the output mirror is also adjusted.

Finally, the invention provides a second method for switching an optical signal. In this, an optical switch including an input collimator, an input mirror, an output mirror and an output collimator is provided. At least one of the input collimator and the output collimator is imaged onto a respective one of the input mirror and the output mirror. The light beam is received at the input collimator. The orientation of the input mirror is adjusted to direct the light beam onto the output mirror. The orientation of the output mirror is also adjusted.

Other apparatus, methods, features, and advantages of the invention will be or become apparent to one of ordinary skill in the art upon examination of the following drawings and detailed description. It is intended that all such additional apparatus, methods, features and advantages disclosed in this description be within the scope of the invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the invention. Moreover, in the drawings, like reference numerals are used to indicate corresponding parts throughout the several views.

FIG. 2B is a front view of an exemplary 4×4 micromirror array of the optical switch shown in FIG. 2A.

FIG. 2C is a perspective view showing exemplary axes of rotation of the micromirrors of the micromirror array shown In FIG. 2B.

DETAILED DESCRIPTION OF THE INVENTION

Figure 1A:
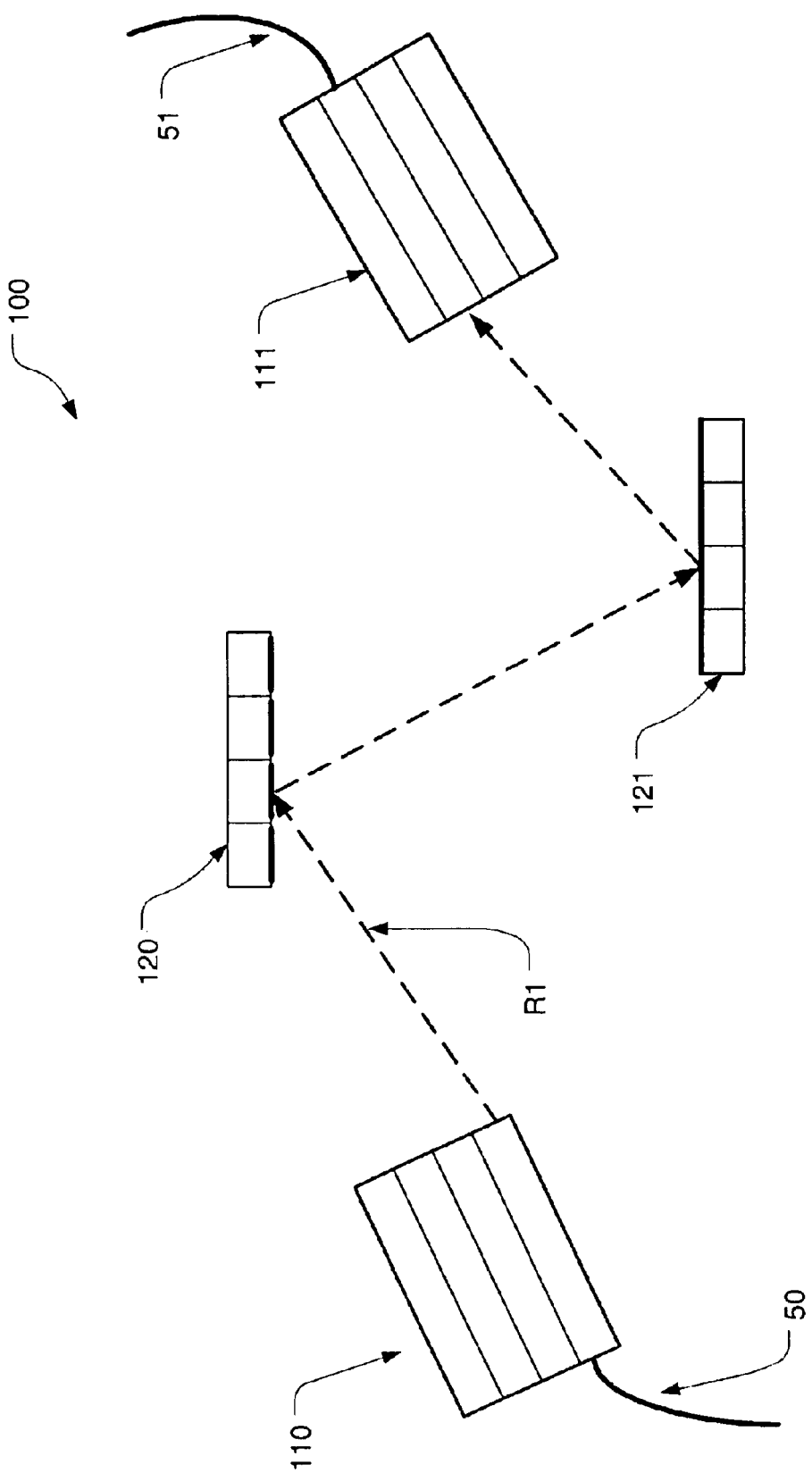
FIG. 1A is plan view of a known optical switch.

An embodiment 200 of an optical switch according to the invention will now be described with reference to FIGS. 2A and 2B. The optical switch 200 is composed of input collimator array 210 and output collimator array 211, and the following elements arranged in order between the input collimator array and the output collimator array: input imaging element 201, input micromirror array 220, converging optical element 225, output micromirror array 221, output imaging element 202.

Input collimator array 210 is composed of a plurality of input collimators 213. Each input collimator 213 receives a light beam that represents an optical signal. The input collimator expands and collimates the light beam to generate a substantially parallel beam directed towards an associated input micromirror (not shown) of the input micromirror array 220. Light beam R1 is received at the input collimator 215 via the input optical fiber 75. Alternatively, a collimated beam of light directed towards one or more of the input micromirrors may be produced in some other way other than a respective optical fiber and collimator. Examples include a beam of light output by a laser diode and the output of a grating or other optical filter.

Output collimator array 211 is composed of a plurality of output collimators 214. Each output collimator focuses a light beam received from an associated output micromirror (not shown) of the output micromirror array 221 for output from the optical switch 200. Light beam R1 is output into output optical fiber 85 via output collimator 216. Onr or more of the output collimators may alternatively be omitted and the corresponding light beam reflected by the associated output micromirror can pass directly to another optical or electro-optical element.

Input imaging element 201 is located between input collimator array 210 and input micromirror array 220.

Curved mirror 225 is located on the optical path between the input micromirror array 220 and the output micromirror array 221. Curved mirror 225 is positioned relative to micromirror arrays 220 and 221 so that the micromirror arrays each lie on, or near, its focal plane, as will be described in more detail below with reference to FIG. 3A.

Curved mirror 225 is curved in the sense that it has a reflecting surface that is concave. The concave reflecting surface may be spherical or aspherical. The curved mirror is an example of a converging optical element. Examples of a converging optical element that may be used instead of curved mirror 225 include a lens having at least one convex spherical or aspherical surface, a converging Fresnel lens, a converging diffractive optical element, another optical element capable of converging light and a combination of such elements. As used in this disclosure, the term lens encompasses single- and multi-element lenses. When a transmissive converging optical element is used instead of the curved mirror shown, the remaining elements of the optical switch are rearranged accordingly. Alternatively, a combination of a transmissive converging optical element and a non-curved mirror may be used without rearranging the remaining elements.

Output imaging element 202 is located between the output micromirror array 221 and output collimator array 211.

Input imaging element 201 and output imaging element 202 are shown as biconvex lenses in the drawings. However, this is not critical to the invention. The function of the imaging elements 201 and 202 may alternatively each be performed by, for example, a converging mirror, a lens with at least one convex surface, a Fresnel lens, a diffractive optical element, another optical element capable of converging light or a combination of such elements.

Figure 2A:
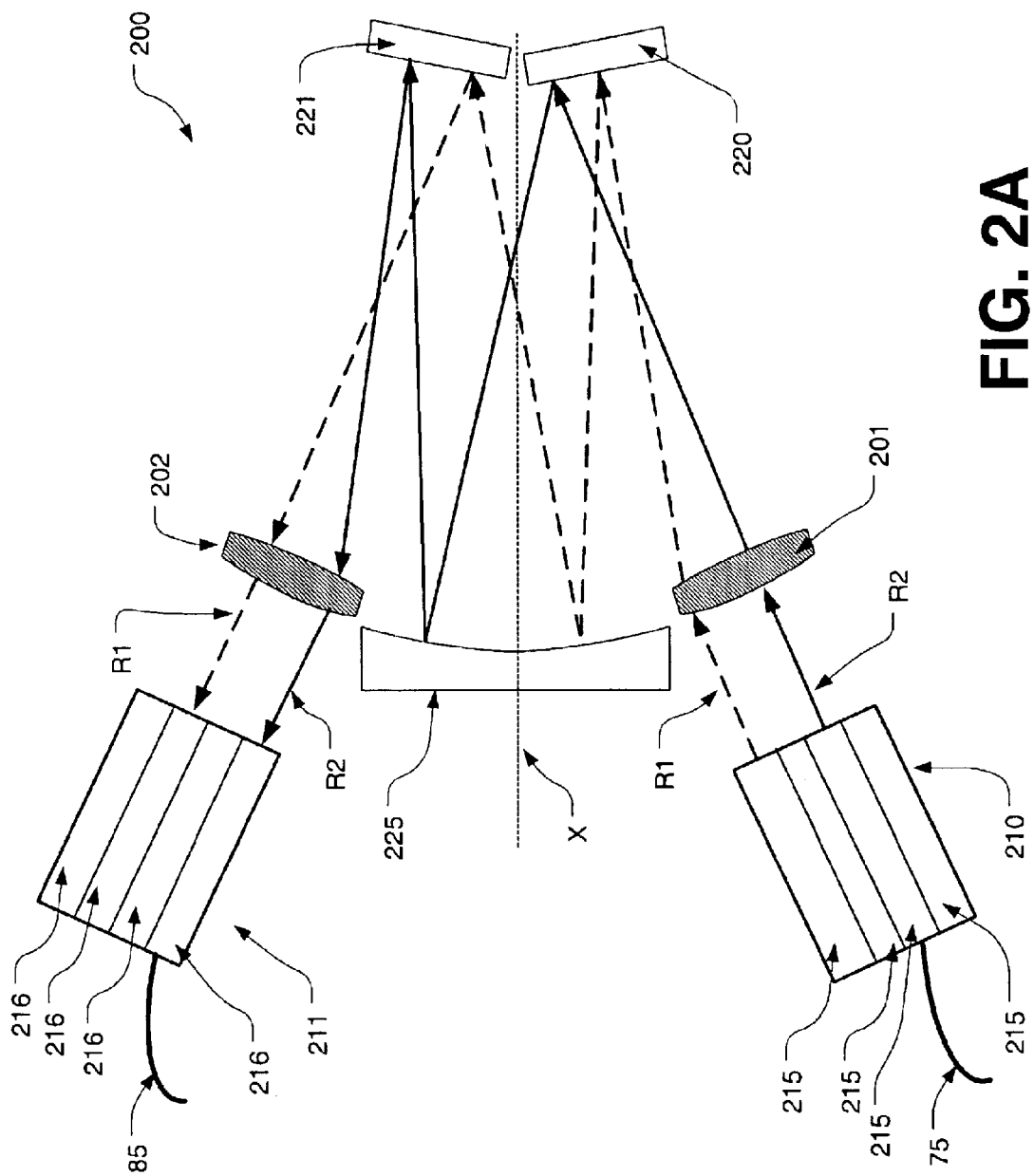
FIG. 2A is a plan view of a first embodiment of an optical switch according to the invention.

FIG. 2A shows two light beam paths R1 and R2 to illustrate the function of micromirrors 250 (FIG. 2B) of input micromirror array 220 and output micromirror array 221. The light beam R1, which represents an optical signal, is received by the input collimator 215, which is one of the input collimators 213 constituting the input collimator array 210. Optical switch 200 is configured to switch light beam R1 to the output collimator 216, which is one of the output collimators 214 of output collimator array 211.

Light beam R1 output by input collimator 215 travels from input collimator 215 to the corresponding micromirror (not shown) of input micromirror array 220. This micromirror will be called the input micromirror. As it passes from the input collimator to the input micromirror, light beam R1 passes through input imaging element 201. The input imaging element images the input collimator array onto the input micromirror array. Consequently, all the light output by input collimator 215 illuminates the input micromirror.

The input micromirror reflects light beam R1 towards curved mirror 225. Curved mirror 225 reflects light beam R1 to the micromirror of output micromirror array 221 corresponding to output collimator 216. This micromirror will be called the output micromirror. Additionally, the curved mirror re-converges light beam R1 so that the waist size of the light beam at the output micromirror is approximately equal to that at the input micromirror.

The output micromirror reflects light beam R1 onto output collimator 216. As it passes from the output micromirror to the output collimator, light beam R1 passes through output imaging element 202. The output imaging element images the output collimator array on the output micromirror array. Consequently, all the light reflected by the output micromirror illuminates the output collimator.

Similarly, light beam R2 passes through the optical switch from the input collimator 217 to the output collimator 218 along an optical path different from that of the light beam R1.

FIG. 2B shows an example of input micromirror array 220. A similar structure can be used as output micromirror array 221. The micromirror array is composed micromirrors 250 arranged in a two-dimensional array. A 4×4 array is shown. Other square or rectangular arrays, including a 1-dimensional array, may be used as the input micromirror array. Input collimator array 210 has the same array size as input micromirror array 220 so that there is a correspondence between collimators and micromirrors in the respective arrays. A similar structure can be used as output micromirror array 221, and a relationship similar to that described exists between the array sizes of the output collimator array and the output micromirror array.

FIG. 2C shows an example of the axes of rotation of an exemplary one of the micromirrors 250 of the input micromirror array 220 shown in FIG. 2B. The remaining micromirrors have similar axes of rotation. Two orthogonal axes of rotation (x and y) are shown. In a one-dimensional micromirror array, the micromirrors need rotate about only one axis of rotation. The dimensions of each micromirror 250 are in the range from about 0.25 mm to about 10 mm.

The micromirror 250 may be rotated about its axis or axes of rotation in several ways including, but not limited to: (1) applying voltages to electrodes located underneath the micromirror, (2) one or more surface drives that drive a pivot arm attached to the micromirror, (3) one or more comb drive actuators that drive a pivot arm attached to the micromirror, (4) one or more comb drive actuators that drive lifting arms that are used in unison to rotate the micromirror, (5) magnetic permanent or induced-dipole elements attached to the micromirror that cause the micromirror to rotate when an external magnetic field is applied, and (6) a soft magnetic material on the non-reflective side of the micromirror and a three-arm magnetic armature with attached coils.

Rotating the input micromirror about at least one axis of rotation steers the light beam onto the output micromirror. The light beam passing from the input micromirror to the output micromirror is reflected and converged by the curved mirror 225. Rotating the output micromirror about at least one axis of rotation steers the light beam to cause the light beam to enter the output collimator corresponding to the output micromirror at an angle of incidence at which the light beam is effectively coupled into the output collimator. The rotation of the output micromirror to achieve effective coupling of the light beam into the output collimator depends on the angle of incidence of the light beam on the output micromirror.

Figure 3A:
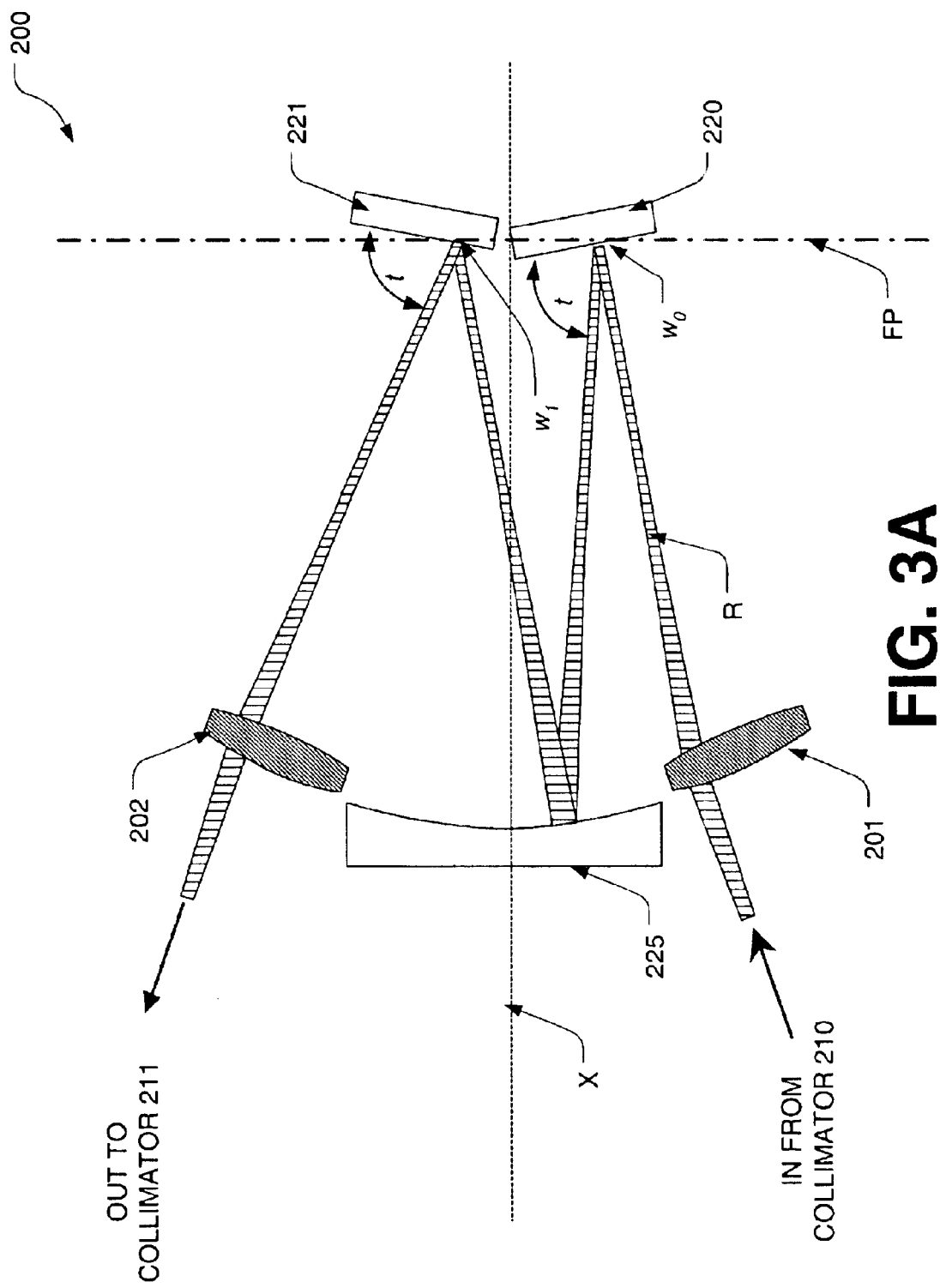
FIG. 3A is a plan view of the optical switch according to the invention showing the beam size of the optical signal as it passes through the optical switch.

FIG. 3A shows the profile of an exemplary light beam R as it passes through the optical switch 200. Input micromirror array 220 and output micromirror array 221 are located at the focal plane FP of curved mirror 225. As a result, the angle t at which the light beam R leaves input micromirror array 220 determines the identity of the output micromirror of output micromirror array 221 onto which the curved mirror reflects the light beam.

Input imaging element 201 images the input collimator array onto input micromirror array 220. Consequently, light beam R converges onto the input micromirror of input micromirror array 220. If the light beam R has a waist size $w_0$ at the input micromirror, then the waist size $w_1$ of the light beam at the output micromirror of the output micromirror array 221 can be expressed as:

$$w_1 = f\lambda/\pi w_0 \qquad (1)$$

Thus, by choosing the focal length f of curved mirror 225 such that $f = \pi w_0^2/\lambda$, where $\lambda$ is the wavelength of the light beam, the waist size $w_1$ of the light beam at output micromirror array 221 will be identical to the waist size $w_0$ at input micromirror array 220. Input micromirror array 220 and output micromirror array 221 may be mounted outside the focal plane of the curved mirror at the expense of a progressive loss of the above waist size identity with increasing distance from the focal plane.

Curved mirror 225 ensures that a light beam converged by input imaging element 201 to a waist size smaller than the size of the micromirrors of the input micromirror array 220 also have a waist size smaller than the size of the micromirrors of the output micromirror array 221. This enables the micromirrors to be small in size and the pitch of the micromirror arrays to be comparable with the size of the micromirrors without undesirable side effects such as crosstalk and beam attenuation.

Interposing the curved mirror 225 between the input micromirror array 220 and the output micromirror array 221 additionally makes the angular range of the micromirrors constituting the micromirror arrays the substantially same, regardless of their position in the micromirror array. Consequently, the full angular range of all the micromirrors of the micromirror arrays is used, unlike the conventional optical switch described above.

Figure 3B:
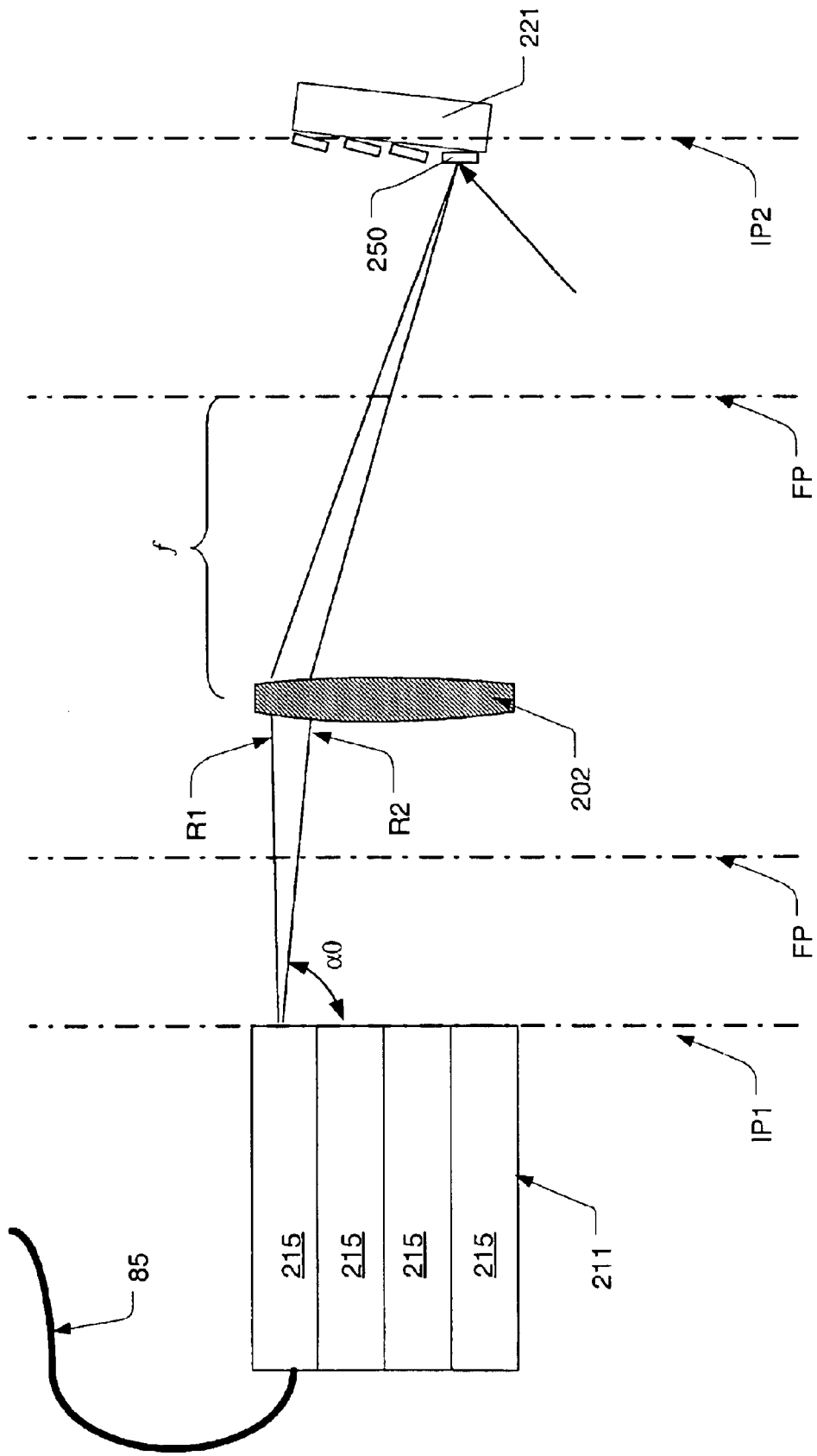
FIG. 3B is a plan view showing a first exemplary embodiment of one of the imaging elements of the optical switch according to the invention.

FIG. 3B shows the portion of the optical switch 200 between output micromirror array 221 and output collimator 211 in further detail. Considerations similar to those to be described next also apply to the portion of the optical switch between input collimator array 210 and input mirror array 220. Output imaging element 202, output micromirror array 221 and output collimator array 211 are located relative to one another to place the output micromirror array at the image plane IP2 of the output collimator array. With the elements located as just described, the output imaging element forms an image of the output mirror array on the output collimator array, and vice versa. This causes all light reflected by a micromirror of the output micromirror array 221 to illuminate the corresponding output collimator 216 of output collimator array 211.

However, mere illumination of output collimator 216 is not sufficient. To couple the light beam effectively into the guided mode of an optical fiber, such as output optical fiber 85, the angle of incidence of the light beam on output collimator 216 should be close to angle $\alpha_0$. Angle $\alpha_0$ is the angle at which output collimator 216 would emit a light beam if output collimator 216 were used as an input collimator. As noted above, angle $\alpha_0$ differs among the collimators of a given collimator array. To effectively couple the light beam into output optical fiber 85, the output micromirror in the output micromirror array 221 is rotated about at least one axis to control the angle of incidence of the light beam entering output collimator 216 precisely to $\alpha_0$.

FIG. 3B shows light beam R incident on exemplary output micromirror 252, one of the micromirrors 250 of output micromirror array 221, and light beams R1 and R2 reflected in two different rotational states of output micromirror 252. Regardless of the rotational state of the output micromirror, the light beams R1 and R2 illuminate output collimator 216. However, the rotational state of micromirror 252 has to be set so that light beam R, after reflection by the micromirror, impinges on the output collimator at the angle of incidence $\alpha_0$ at which it is coupled effectively into the output collimator. In the rotational state of micromirror 252 that reflects incident light beam R as reflected light beam R1, the angle of incidence of reflected light beam R1 on the output collimator is different from $\alpha_0$. As a result, reflected light beam R1 is not effectively coupled into the output collimator. In the rotational state of micromirror 252 that reflects incident light beam R as light beam R2, the angle of incidence of reflected light beam R2 on the output collimator is equal to $\alpha_0$. As a result, light beam R2 is effectively coupled into the output collimator.

Figure 4:
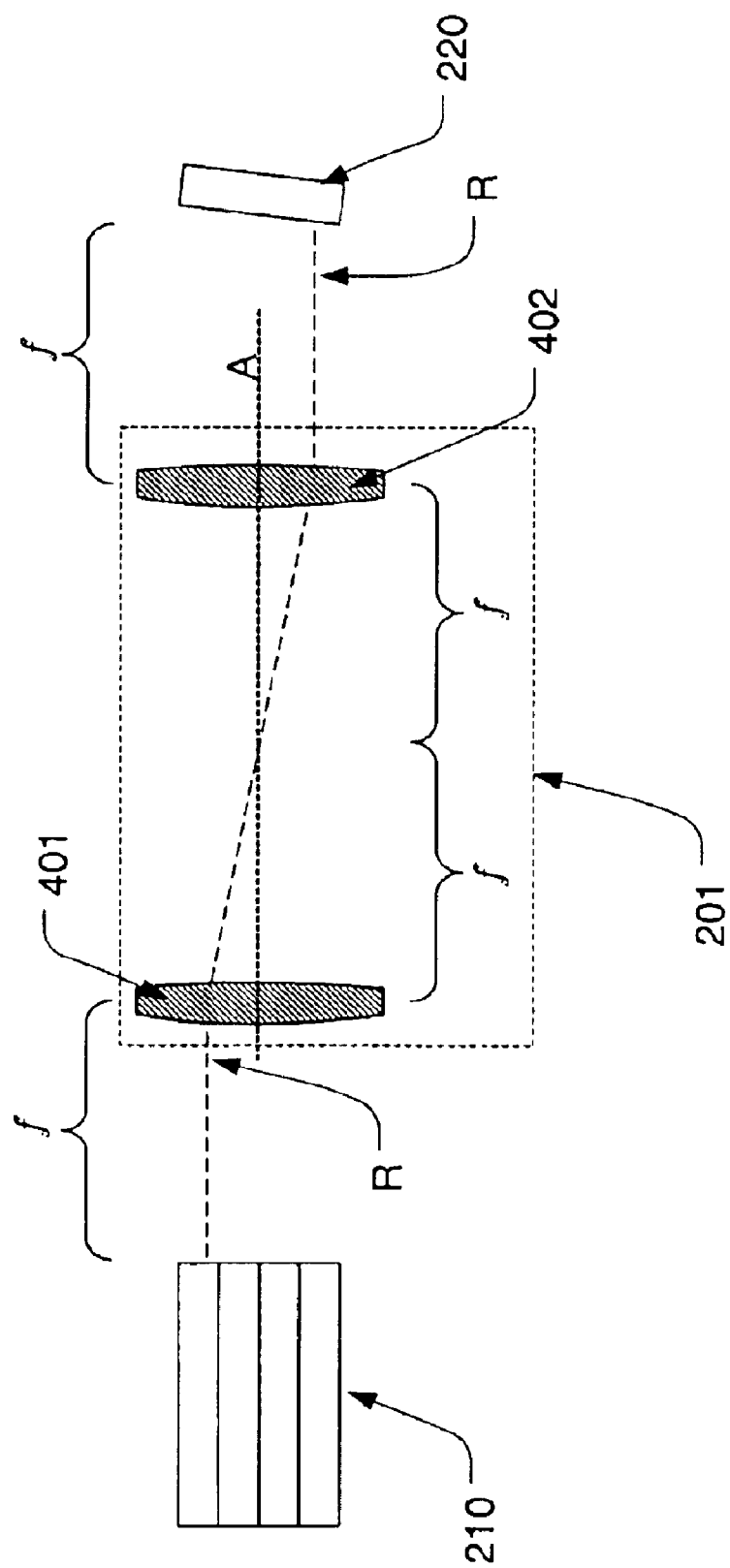
FIG. 4 is a plan view showing a second exemplary embodiment of one of the imaging elements of the optical switch according to the invention.

FIG. 4 shows an alternative embodiment 400 of input imaging element 201. Imaging element 400 can additionally or alternatively be used as output imaging element 202 (FIG. 2A). Imaging element 400 is composed of lenses 401 and 402, each of which has a focal length of f. The lenses are centered on the optical axis A and are separated by a distance of twice the focal length of the lenses, i.e., 2f. Imaging element 400, input collimator array 210 and input micromirror array are located relative to one another such that lens 401 is at a distance f from the input collimator array 220 and lens 402 is at a distance f from the micromirror array, as shown in FIG. 4.

Referring once more to FIG. 2A, and additionally to FIG. 4, imaging element 400, when used as input imaging element 201, reduces the variation in the angle of incidence among the light beams output by input collimator array 210 on input micromirror array 220. The light beams output by input collimator array 210 include light beams R1 and R2. After passing through imaging element 400, light beam R output by any of the input collimators 213 is incident on the corresponding input micromirror of input micromirror array 220 at the same angle at that at which it was emitted from the input collimator, and regardless of the position of the input collimator in the input collimator array. Similar benefits are obtained when the imaging element 400 is used as output imaging element 202.

Imaging element 400 is shown as being composed of two lenses that are biconvex spherical lenses. Other optical elements capable of converging light may be used instead of the lenses shown include, but are not limited to, a converging mirror, a lens or lens combination with at least one convex surface, a Fresnel lens, a diffractive optical element or a combination of such elements.

Figure 5:
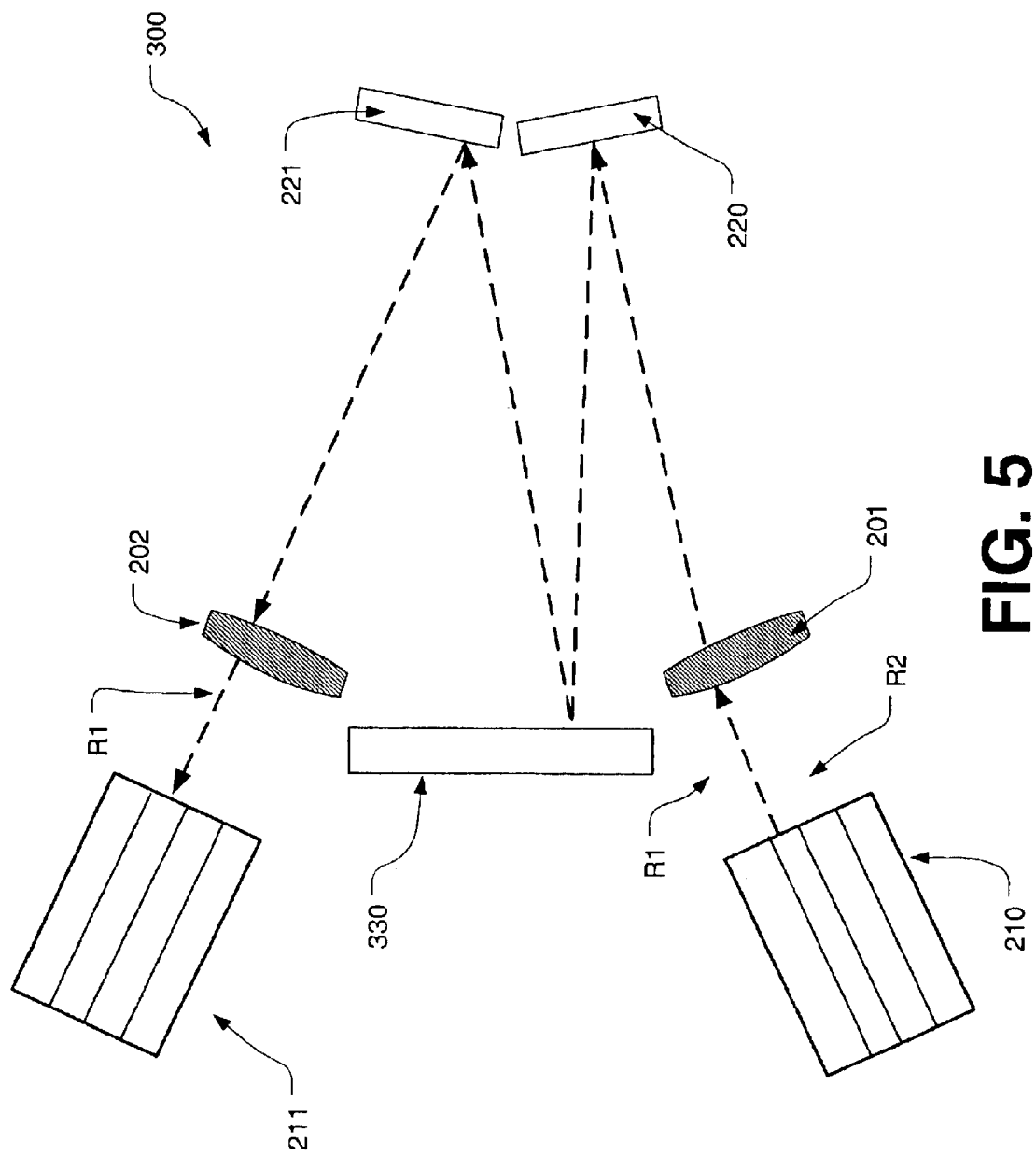
FIG. 5 is a plan view a second embodiment of an optical switch according to the invention.

The curved mirror may be omitted in applications in which the waist size of the light beam is less important, such as when the size of the micromirrors constituting micromirror arrays 220 and 221 is less important. FIG. 5 shows a second embodiment 300 of an optical switch according to the invention that incorporates the flat mirror 330 instead of the curved mirror 225 shown in FIG. 2A. Elements of the optical switch 300 that correspond to elements of the optical switch 200 shown in FIG. 2A are indicated using the same reference numerals and will not be described again here. The elements of the optical switch 300 are arranged in a manner similar to the elements of the optical switch 200, except that the flat mirror lacks a focal plane at which the micromirror array are to be located.

In the optical switch 300, the above-stated advantages of the imaging elements 201 and 202 are obtained notwithstanding the lack of a curved mirror or other optical converging element.

Figure 1B:
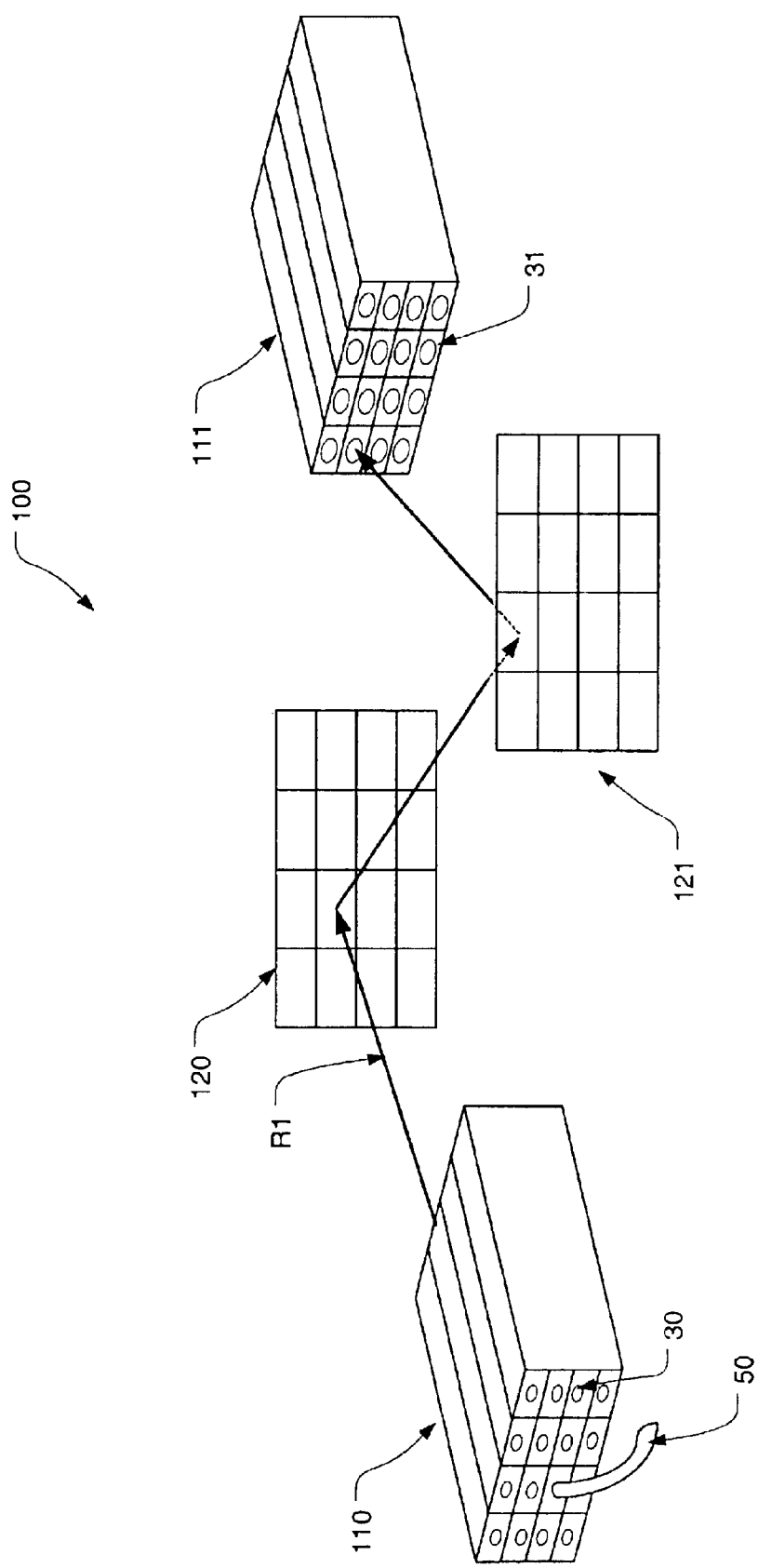
FIG. 1B is a perspective view of the known optical switch shown in FIG. 1A.
Figure 1C:
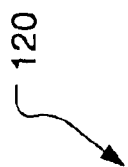
FIG. 1C is a front view of a 4×4 micromirror array.
Figure 1D:
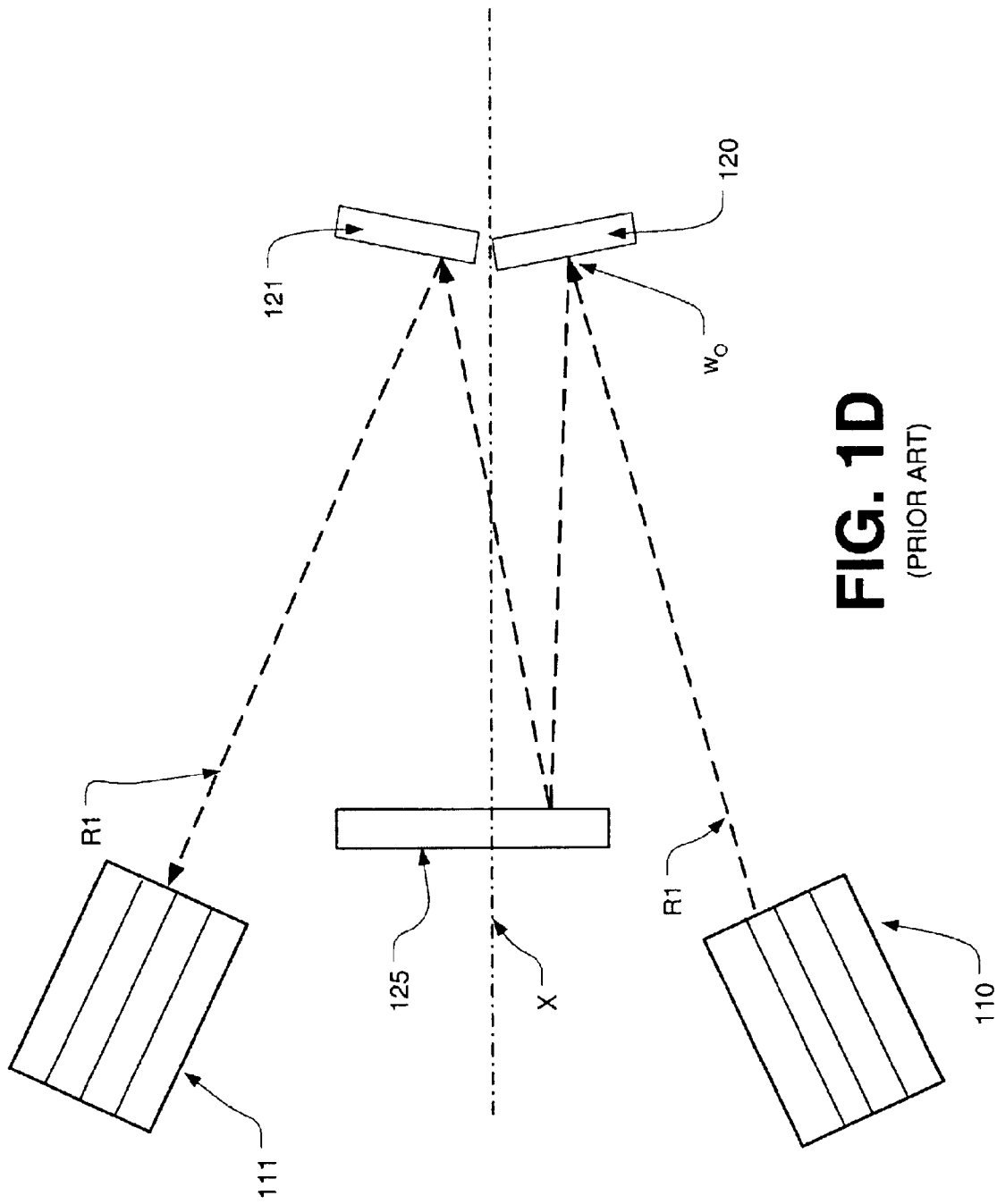
FIG. 1D is a plan view of another known optical switch.

In an alternative embodiment of optical switch 300, flat mirror 330 may be omitted, and the elements may be rearranged in a manner similar to that shown in FIGS. 1A, 1B and 1D, but with input imaging element 201 located between input collimator 210 and input micromirror array 220, and output imaging element 202 located between output micromirror array 221 and output collimator array 211.

Although this disclosure describes illustrative embodiments of the invention in detail, it is to be understood that the invention is not limited to the precise embodiments described, and that various modifications may be practiced within the scope of the invention defined by the appended claims.

We claim:

1. An optical switch, comprising:
   an input collimator for receiving and collimating an input light beam and for outputting same;
   an output collimator;
   an input mirror arranged to receive said light beam from said input collimator; an output mirror arranged to receive said light beam reflected by said input mirror and for reflecting said light beam into said output collimator; and
   a converging optical element located to receive said light beam reflected by said input mirror and for reflecting said light beam onto said output mirror.

2. The optical switch of claim 1, additionally comprising imaging means for imaging at least one of said input collimator and said output collimator onto a respective one of said Input mirror and said output mirror.

3. The optical switch of claim 2, in which:
   said converging optical element is a first converging optical element; and
   said imaging means includes a second converging optical element.

4. The optical switch of claim 3, in which said second converging optical element includes at least one of a lens having at least one convex surface, a Fresnel lens and a diffractive optical element.

5. The optical switch of claim 2, in which:
   said converging optical element is a first converging optical element; and said imaging means includes two second converging optical elements each having a focal length of f, said second converging optical elements being spaced from one other by a distance equal to twice the focal length f.

6. The optical switch of claim 2, in which said converging optical element has a focal length f where $f=\pi w_0^2/\lambda$, $w_0$ is the waist size of the light bean at said input mirror, and $\lambda$ is the wavelength of said light beam.

7. The optical switch of claim 1, in which said converging optical element has a focal f where $f=\pi w_0^2/\lambda$, $w_0$ is the waist size of the light beam at said input mirror, and $\lambda$ is the wavelength of said light beam.

8. The optical switch of claim 1, additionally comprising an input mirror array, said input mirror constituting an element of said input mirror array.

9. The optical switch of claim 1, additionally comprising an output mirror array, said output mirror constituting an element of said output mirror array.

10. The optical switch of claim 1, in which said converging optical element includes a concavely curved mirror.

11. The optical switch of claim 1, in which said converging optical element includes one of a lens having at least one convex refracting surface, a Fresnel lens and a diffractive optical element.

12. An optical switch, comprising:
an input collimator for receiving and collimating an input light beam and for outputting same;
an output collimator;
an input mirror arranged to receive said light beam from said input collimator;
an output mirror arranged to receive said light beam reflected by said input mirror and for reflecting said light beam into said output collimator; and
imaging means for imaging at least one of said input collimator and said output collimator on a respective one of said input mirror and said output mirror.

13. The optical switch of claim 12, in which said input imaging means comprises at least one converging optical element.

14. The optical switch of claim 13, in which said converging optical element includes at least one of a lens having at least one convex surface, a Fresnel lens and a diffractive optical element.

15. The optical switch of claim 12, in which said imaging means includes two converging optical elements each having a focal length of f, said converging optical elements being spaced from one other by a distance equal to twice the focal length f.

16. A method of switching a light beam, the method comprising:

providing an optical switch including an input mirror and an output mirror;
receiving the light beam;
directing said light beam towards said input mirror;
adjusting an orientation of said input mirror to direct said light beam onto said output mirror;
converging said light beam after reflection by said input mirror and prior to reflection by said output mirror; and
adjusting an orientation of said output mirror.

17. The method of claim 16, in which:
said method additionally comprises providing a converging optical element having a focal length f, in which $f=\pi w_0^2/\lambda$, $w_0$ is the waist size of said light beam at said input mirror, and $\lambda$ is the wavelength of said optical signal; and
said converging is performed with said converging optical element.

18. The method of claim 16, in which:
the method additionally comprises:
providing an input collimator and an output collimator, and
imaging at least one of said input collimator and said output collimator onto a respective one of said input mirror and said output mirror;
said light beam is received via said input collimator; and
in adjusting said orientation of said output mirror, said orientation is adjusted to direct said light beam into said output collimator at an angle of incidence at which said light beam is effectively coupled into said output collimator.

19. A method of switching a light beam, the method comprising:
providing an optical switch including an input collimator, an input mirror, an output mirror and an output collimator;
imaging at least one of said input collimator and said output collimator onto a respective one of said input mirror and said output mirror;
receiving the light beam at said input collimator;
adjusting an orientation of said input mirror to direct said light beam onto said output mirror; and
adjusting an orientation of said output mirror.

20. The method of claim 19, in which, in adjusting said orientation of said output mirror, said orientation is adjusted to direct said light beam into said output collimator at an angle of incidence at which said light beam is effectively coupled into said output collimator.

* * * * *